Feb. 10, 1970  D. B. RADDATZ  3,495,123
ELECTRODE STRUCTURE
Filed Dec. 29, 1967
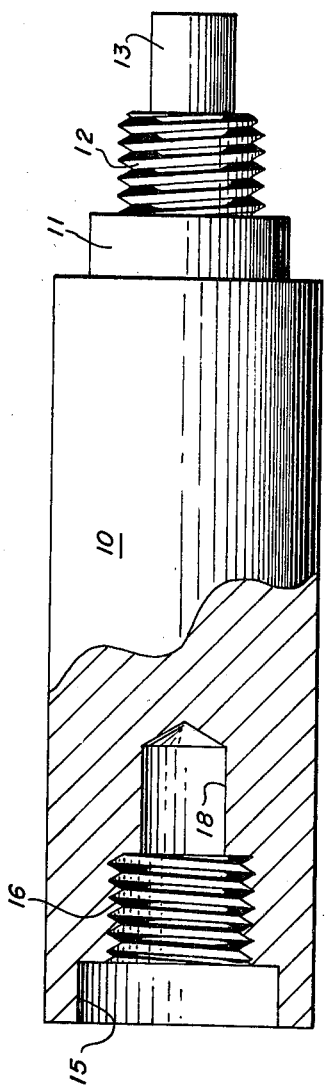
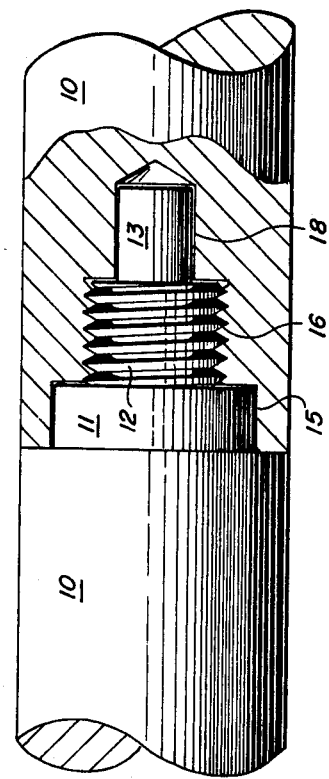
INVENTOR.
DWIGHT B. RADDATZ
BY
ATTORNEYS

United States Patent Office 3,495,123
Patented Feb. 10, 1970

3,495,123
ELECTRODE STRUCTURE
Dwight B. Raddatz, Muncie, Ind., assignor to Ball Brothers Company Incorporated, Muncie, Ind., a corporation of Indiana
Filed Dec. 29, 1967, Ser. No. 694,548
Int. Cl. H01j 17/04
U.S. Cl. 313—357                13 Claims

ABSTRACT OF THE DISCLOSURE

Joint structure for erodable electrodes having at least three concentric reductions in diameter on both male and female ends, with other than the largest reduced diameter carrying fastening means, such as threads, and preferably the second reduction carrying fastening means, in order to provide a strong joint which maintains its integrity as the electrode erodes.

---

The instant invention relates to a joint structure for segmented electrodes. More specifically, the instant invention relates to a joint structure which maintains the integrity and strength of an electrode made up of segments as the electrode erodes.

It is often desirable to pass high amperage electrical currents through conductive fluid masses. Molten metal, salts, or glass, are often heated or otherwise treated by placing electrodes within the molten mass and passing a current therethrough. As a result of the often extreme temperature conditions and the current flow, the electrodes normally erode with use. In the case of cylindrically shaped electrodes, use often produces a conically shaped electrode with the smaller diameter at the protruding end of the electrode. However, the electrode is reduced in diameter to a greater or lesser degree along the entire length exposed to the molten bath.

In order to provide operations for a satisfactory length of time, electrodes are often rather large in diameter and of substantial length. Therefore, the electrodes are usually produced in more easily handled segments which are assembled and mounted at the site of use. The connecting joint between the segments must be sufficiently strong to support the assembled electrode when it is cantilevered into the operating environment. It is not unusual to use somewhat weak or brittle structural materials as electrodes such as carbon, platinum, or molybdenum. Therefore, it is important to produce a joint construction which produces a strong joinder between the segments and does not place undue stress upon the material. The conventional approach to joining electrode segments is illustrated in U.S. Patent No. 3,297,903, wherein one end of the electrode is provided with a threaded plug while the other end is provided with a complementary threaded socket. The two are joined by advancing the threads of the plug into the threads of the socket.

Unfortunately, while the conventional approach provides a strong and useful joinder initially as the electrode erodes away, the threaded area is exposed and the electrode segments may break apart. The obvious answer of making the plug of a smaller diameter so that the threads are deeper within the electrode, is not satisfactory in that this approach does not provide the necessary structural strength. The reduced diameter plug would not be capable of supporting the assembled electrode and would merely break off.

It is therefore an object of the instant invention to provide an electrode joint structure which does not fail as the electrode erodes away.

It is another object of the instant invention to provide electrode joint structure which is sufficiently strong to support the assembled electrode.

It is yet another object of the instant invention to provide electrode joint structure which utilizes the extreme conditions of current flow and/or temperature to fuse the electrode into a unitary length.

Still yet another object of the instant invention is to provide an electrode joint structure which is easily produced and assembled.

According to the instant invention, a superior electrode joint structure is accomplished by providing at least two, and preferably three portions of reduced diameter at one end of the electrode. Fastening means such as threads or expanding clamps are provided, preferably not on the larger first-reduced diameter portion, but always on the second or other small diameter portion. On the other end of the electrode, or on a complementary electrode, a socket structure of the same configuration is formed. In this manner, the first-reduced diameter portions of both the socket and plug portion provide structural strength because of the substantial size of the plug. However, the longitudinal securing force is generated by the smaller diameter portion containing the fastening means. As the electrode erodes to the overall size of the first-reduced diameter, the plug is exposed and no longer contributes to the structural strength of the joint. However, in counter-distinction to the conventional joinder in which the longitudinal fastening force also fails, the joinder structure of the instant invention is still secured longitudinally by the fastening means upon the smaller diameter portion of the joinder. Further, since the overall electrode is reduced in size by erosion, the structural strength of the smaller diameter-connecting portion including the fastening means is entirely adequate to support the smaller and lighter electrode. As a practical matter, by the time the electrode has eroded to the extent that the diameter including the fastening means is exposed, the extreme electric current and/or temperature conditions have fused the segments of the electrode into a unitary length. The elevated temperature permits the molecular structure, though remaining a solid and having substantial strength at all times, to accommodate and become one lattice, or other arrangement of molecules, instead of the original distinct segments having an interface therebetween. This phenomenon is well known.

The invention will be more readily understood with reference to the drawing, in which, FIGURE 1 is an illustration with partial cut-away of the preferred embodiment of an electrode segment according to the instant invention; and, FIGURE 2 is an illustration with partial cut-away of an assembled electrode joint according to the instant invention.

As shown in FIGURE 1, electrode segment 10 has on the plug, or male portion thereof, a first reduced diameter portion 11 which is basically cylindrical in shape and has a smooth surface. However, the second reduced diameter portion 12 has exterior threads. Portion 12 is similar in shape to and concentric with portion 11, but is of a substantially smaller diameter. Concentric third reduced diameter portion 13 is even smaller in diameter than portion 12 and of a similar shape. In the preferred embodiment, portion 13 is smooth and serves as a guide projection. The other end of electrode 10 has a socket figure configuration including, as shown in cross-section, a first socket portion 15 which is of a very slightly larger diameter than portion 11. Likewise, threaded portion 16 is of a diameter complementary to portion 12. The smallest diameter socket 18 is of a slightly larger diameter than portion 13.

As shown in FIGURE 2, the electrode segments 10 are assembled by fitting plug portion 13 in socket 18, threading plug portion 12 into socket portion 16, and fitting plug portion 11 in socket portion 15. The overall effect of the three complementary plug-in socket portions is to provide a strong joint which would not fail when erosion of the electrode segments exposed plug portion 11.

As will be apparent from the above discussion, the preferred embodiment illustrated in the drawing is susceptible to several modifications within the scope of the invention. For instance, the number of reduced diameter plug-in socket sections is not critical, though three is felt to be optimum. As long as a first larger reduced diameter portion is provided to lend strength to the joint, and a second reduced diameter portion smaller than the first, but not necessarily adjacent thereto, is provided with a fastening means to provide longitudinal joinder of the segments, the advantages of the instant invention will be largely realized. Of course, it would be possible to thread all of the reduced diameter portions, but nothing would be gained from this since threading of one portion provides more than sufficient longitudinal strength. Threads are, of course, the most convenient and widely used fastening means, but any of the conventional fastening means suitable for securing a projection within a hole would obviously be useful with the instant invention.

Practical experience in various environments will determine at about what stage the segments of an electrode tend to fuse into a single electrode. The diameter of the threaded portion of the joinder is then determined at a size somewhat less than the size of the eroded electrode at the time of fusion. This of course will vary between uses and must be determined for each use. However, the principle of the invention will be applicable, and joint strength can be provided even if the diameter of the threaded portion is insufficient to provide the required strength.

It will be apparent from the above description and drawing that various modifications of the joint of the instant invention may be made within the scope of the invention. Therefore, the invention is not intended to be limited to the particular structure illustrated and discussed except as may be required by the following claims.

What is claimed is:

1. A joint structure for joining at least two elongated segments comprising, a first segment having on an end thereof a first plug of circular cross-section and at least one other plug of smaller diameter than that of the first plug and concentric therewith located in a position more distant from the segment proper than the first plug, and external fastening means located on the smaller plug, a second segment having defined in an end thereof a first socket of circular cross-section and at least one other socket of smaller diameter than that of the first socket and concentric therewith, the said two sockets comprising a single volume with the smaller diameter socket being a greater distance from the end of the second segment, and internal fastening means located within the smaller diameter socket, said first and second segments being joined with said first plug closely fitted within said first socket, said smaller plug fitted within said smaller socket, and said external fastening means engaging said internal fastening means, whereby said segments are securely and strongly joined.

2. A joint structure as set forth in claim 1 wherein the external and internal fastening means are, respectively, extrnal and internal threads.

3. A joint structure as set forth in claim 1 wherein the segments are electrode segments of carbon, platinum or molybdenum.

4. A joint structure for joining at least two elongated segments comprising, a first segment having on the end thereof a first cylindrical plug, a second cylindrical plug of smaller diameter than that of the first plug and concentric therewith, and a third cylindrical plug of smaller diameter than that of the second plug and concentric therewith; said three plugs forming a unitary extension of the segment with the smallest plug most distant from the segment and the largest plug adjacent to the segment, and external threads on the second plug, a second segment having defined in an end thereof a first socket of circular cross-section, a second socket of circular cross-section of smaller diameter than that of the first socket and concentric therewith; and a third socket of circular cross-section of smaller diameter than that of the second socket and concentric therewith, said three sockets defining a single volume with the smallest diameter socket being a greater distance from the end of the second segment, and internal threads located within the second socket, said first and second segments being joined with said first plug closely fitted within said first socket, said second plug fitted within said second socket, said third plug closely fitted within said third socket, and said external and internal threads engaging one another, whereby said segments are securely and strongly joined.

5. An electrode segment having on one end thereof a first plug of circular cross-section, at least one other plug of smaller diameter than that of the first plug and concentric therewith located in a position more distant from the segment proper than the first plug, and external fastening means located on the smaller plug.

6. An electrode segment as set forth in claim 5 wherein said fastening means are external threads.

7. An electrode segment as set forth in claim 5 wherein the segments are made of carbon, platinum, or molybdenum.

8. An electrode segment having defined at one end thereof a first socket of circular cross-section and at least one other socket of smaller diameter than that of the first and concentric therewith, said two sockets being arranged with the smaller socket being a greater distance from the end of the second segment than the larger socket, and internal fastening means located within the smaller diameter socket.

9. An electrode segment as set forth in claim 8 wherein said fastening means are internal threads.

10. An electrode segment as set forth in claim 8 wherein the segments are made of carbon, platinum, or molybdenum.

11. An electrode segment having on one end thereof a first plug of circular cross-section and at least one other plug of smaller diameter than that of the first plug and concentric therewith located in a position more distant from the segment proper than the first plug, said segment having defined at the other end thereof, a first socket of circular cross-section complementary to that of said first plug, and at least one other socket concentric with the first socket and of a circular cross-section complementary to said smaller plug, said smaller plug and said smaller socket each having fastening means located thereon.

12. An electrode segment as set forth in claim 11 wherein said fastening means are external threads on said smaller plug and internal threads on said smaller socket.

13. An electrode segment having on one end thereof a first cylindrical plug, a second cylindrical plug of smaller diameter than that of the first plug and concentric therewith, and a third cylindrical plug of smaller diameter than that of the second plug and concentric therewith, said three plugs forming a unitary extension of the segment with the smallest plug most distant from the segment and the largest plug adjacent to the segment, the second plug having external threads thereon, the other end of the segment having defined therein a first socket of circular cross-section complementary to said first plug, a second socket of circular cross-section complementary to said second plug and concentric with the first socket and a third socket of circular cross-section complementary to said third plug and concentric with the second socket, said three sockets defining a single volume with the third socket being a greater distance from the end of said segment and the first socket being adjacent the end of said segment, and internal threads located within the second socket.

References Cited

UNITED STATES PATENTS

| | | | |
|---|---|---|---|
| 1,018,003 | 2/1912 | Redlich | 313—354 |
| 1,912,560 | 6/1933 | Wiles | 287—127 X |
| 3,373,308 | 3/1968 | Perrin | 313—357 |

FOREIGN PATENTS 983,590  2/1965.  Great Britain.

JOHN W. HUCKERT, Primary Examiner

A. J. JAMES, Assistant Examiner

U.S. Cl. X.R.

13—18; 287—127; 313—354